United States Patent [19]

Worthington et al.

[11] Patent Number: 4,554,151

[45] Date of Patent: Nov. 19, 1985

[54] PROCESS FOR PRODUCING $K_3H(SO_4)_2$ CRYSTALS AND POTASSIUM SULFATE CRYSTALS

[75] Inventors: Ralph E. Worthington, Winter Haven; Alex Magdics; Donald B. Stain, both of Lakeland, all of Fla.

[73] Assignee: Prodeco, Inc., Mulberry, Fla.

[21] Appl. No.: 536,378

[22] Filed: Sep. 27, 1983

[51] Int. Cl.$^4$ .......................... C01D 5/02; C01D 5/12
[52] U.S. Cl. .................................. 423/551; 423/520; 423/166; 423/199
[58] Field of Search ............... 423/191, 193, 166, 205, 423/499, 520, 551, 552, 554; 23/298, 300, 302 R, 303

[56] References Cited

U.S. PATENT DOCUMENTS

| | | | |
|---|---|---|---|
| 2,689,041 | 9/1954 | Dancy | 423/166 |
| 2,788,257 | 4/1957 | Dake | 23/302 |
| 3,348,913 | 10/1967 | Veronica | 423/552 |
| 3,402,018 | 9/1968 | Waters | 423/552 |
| 3,998,935 | 12/1976 | Adams | 423/552 |
| 4,045,543 | 8/1977 | Sardisco | 423/482 |
| 4,215,100 | 7/1980 | Sokolov et al. | 423/552 |
| 4,342,737 | 8/1982 | Iwashita et al. | 423/520 |

FOREIGN PATENT DOCUMENTS

| | | | |
|---|---|---|---|
| 1902738 | 9/1970 | Fed. Rep. of Germany | 423/552 |
| 787713 | 9/1935 | France | |
| 1310550 | 9/1961 | France | 423/552 |
| 435772 | 9/1935 | United Kingdom | |
| 2068918 | 8/1981 | United Kingdom | |
| 558855 | 9/1977 | U.S.S.R. | 423/551 |
| 806605 | 2/1981 | U.S.S.R. | 423/191 |

Primary Examiner—Gary P. Straub
Attorney, Agent, or Firm—Fleit, Jacobson, Cohn & Price

[57] ABSTRACT

A process for producing $K_2SO_4$ from potassium chloride salts, calcium sulfate salts and another sulfate source wherein syngenite is formed and then decomposed with mineral acid to produce crystalline $K_3H(SO_4)_2$. The $K_3H(SO_4)_2$ crystals are recrystallized to produce $K_2SO_4$ crystals.

6 Claims, 5 Drawing Figures

PROCESS FLOW DIAGRAM
SYLVINITE TO POTASSIUM SULPHATE

PHASE DIAGRAM CaSO$_4$–K$_2$SO$_4$ IN WATER

PHASE DIAGRAM KCl-NaCl IN WATER

PHASE DIAGRAM $K_2SO_4-H_2SO_4$ IN WATER

PHASE DIAGRAM K2SO4-H2SO4 IN WATER

PROCESS FLOW DIAGRAM
SYLVINITE TO POTASSIUM SULPHATE

PROCESS FOR PRODUCING K$_3$H(SO$_4$)$_2$ CRYSTALS AND POTASSIUM SULFATE CRYSTALS

CROSS-REFERENCE TO RELATED APPLICATIONS

This application is related to Ser. No. 536,379, filed Sept. 27, 1983, now abandoned, which is in turn the parent of divisional application Ser. No. 618,142, filed June 7, 1984.

BACKGROUND OF THE INVENTION

1. Field of the Invention

This invention relates to a method for producing K$_2$SO$_4$ crystals comprising reacting a potassium chloride salt, a calcium sulfate salt and a sulfate source to produce syngenite, decomposing the syngenite with a mineral acid to produce KHSO$_4$, crystallizing the KHSO$_4$ to produce the double salt crystal K$_3$H(SO$_4$)$_2$ and recrystallizing the thus-formed K$_3$H(SO$_4$)$_2$ crystals to recover K$_2$SO$_4$ in crystalline form.

2. Description of the Prior Art

Potassium chloride, the major form in which potassium is used in fertilizers, has been known for many years to have agronomic disadvantages when compared with certain other potassium salts. Thus, currently the sulphate and nitrate are widely used on crops such as tobacco, tomatoes, and potatoes, especially for those to be used in the production of potato chips (crisps).

The chloride ion, if allowed to build to sufficiently high levels, is toxic to most plant species, and its elimination is a desirable aim for the fertilizer industry. In arid areas, totally dependent upon irrigation for their water, for example, the build-up of chloride ions in the soil can become a major factor in producing a reduced crop yield. At such times, major quantities of water are required to flush out the chloride. Such flushing not only wastes large quantities of valuable water, but, at the same time, flushes out necessary fertilizer constituents in the soil.

The major, if not the sole, factor which has caused the continued use of potassium chloride under these circumstances, is the ready availability and consequent low cost of the chloride as compared with other potassium salts.

The most common substitute for potassium chloride is potassium sulphate. This salt exists in various mineral forms in a number of places, but its separation, usually by crystallization techniques, is more complex and more expensive than that for the chloride. It is produced directly as a double sulphate salt along with magnesium sulphate in the Western U.S.A., but such material, although not expensive, per se, is low in potassium concentration and hence more costly to transport and store.

For many years, the chloride salt of potassium has been converted into the sulphate by high temperature reaction with sulfuric acid, and considerable quantities are manufactured in this way, particularly in Belgium. U.S. Pat. No. 4,342,737 discloses one such process. The major factors restricting further production by this method are threefold:

1. The high energy requirement.
2. The highly corrosive nature of the reactants and the by-product hydrogen chloride.
3. The need for a local market for the hydrogen chloride produced—otherwise, it must be neutralized at considerable cost before it can be discarded.

For many years, varying routes have been described to convert the chloride using calcium sulphate or sodium sulphate, but none has been used commercially up to the present.

Many of the routes proposed produce glaserite, a double salt of potassium and sodium sulphate, Na$_2$SO$_4$.3K$_2$SO$_4$, as an intermediate and subsequently react with excess potassium chloride to convert the sodium sulphate to potassium sulphate. The product may be recovered, for example, by evaporation and recrystallization. U.S. Pat. No. 4,215,100 is directed to such a process. Other routes produce the calcium double salt, syngenite, CaSO$_4$.K$_2$SO$_4$.H$_2$O as intermediary. This may be decomposed by water at elevated temperature and pressure, as disclosed in British Patent No. 435,772, or by concentrated ammonia at low temperature, as disclosed in French Patent No. 787,713. In British Patent No. 2,068,918, sylvinite, a double salt of potassium and sodium chloride of variable composition, and calcium sulphate are reacted with aqueous ammonia to produce the potassium sulphate, sodium sulphate double salt; the double salt is reacted with sylvite or additional sylvinite in aqueous ammonia to produce potassium sulfate crystals.

All such routes are complex, costly, major energy users and may require operation under undesirable conditions.

Thus a need has continued to exist for a process of producing K$_2$SO$_4$ using readily available raw materials of low cost, said process being relatively uncomplicated, highly energy efficient, and requiring no substantial equipment cost outlay.

SUMMARY OF THE INVENTION

It is an object of this invention to produce an agronomically acceptable form of potassium.

It is a further object of this invention to produce potassium in the form of potassium sulfate.

It is another object of this invention to produce potassium sulfate by a process which is relatively uncomplicated and highly energy efficient to operate.

It is still another object of this invention to produce potassium sulfate from sylvinite.

It is yet another object of this invention to produce potassium sulfate utilizing a process wherein various of the process by-products are returned to the production cycle.

These and other objects of the invention, as will hereinafter become more readily apparent, have been accomplished by a simple process which produces, and then decomposes, syngenite to yield potassium sulfate and a sodium chloride by-product, using potassium chloride, a calcium sulfate salt and a sulfate source as starting materials.

In reaction stage 1, potassium chloride and a sulfate are agitated with a calcium sulfate or penta salt suspension which may be recycled from a subsequent decomposition, stage 2, to produce sodium chloride and syngenite in suspension according to the equation:

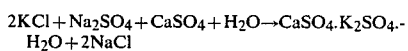

Or, $$8KCl + 4Na_2SO_4 + 5CaSO_4.K_2SO_4.H_2O + 4H_2O \rightarrow 5CaSO_4.K_2SO_4.H_2O) + 8NaCl$$

After separation, the syngenite is fed to reaction stage 2 where it is reacted with a hot sulfuric acid containing solution and thereby decomposed into calcium sulfate or penta salt and potassium sulfate, depending on reaction conditions. The stochiometry is as follows:

$$H_2SO_4 + CaSO_4.K_2SO_4.H_2O \rightarrow CaSO_4 + 2KHSO_4 + H_2O$$

Or, $$4H_2SO_4 + 5(CaSO_4.K_2SO_4.H_2O) \rightarrow 5CaSO_4.K_2SO_4.H_2O + 8KHSO_4 + 4H_2O$$

The suspension so produced is separated at the reaction temperature, and the calcium sulfate or penta salt removed may be recycled to stage 1 for further syngenite synthesis. The resultant hot solution containing potassium, sulfate, and bisulfate ions, at appropriate concentrations, is cooled to crystallize $K_3H(SO_4)_2$, a double salt of potassium sulfate and bisulphate. This is removed by filtration or other suitable means and the mother liquor recovered may be reheated and recycled to stage 2 to decompose further syngenite.

Crystallization of an aqueous solution of the double salt, $K_3H(SO_4)_2$, yields crystals of potassium sulfate, the desired product, and a mother liquor containing potassium bisulfate and free sulfuric acid which may be separated and recycled to stage 2 to decompose further syngenite.

DESCRIPTION OF THE PREFERRED EMBODIMENT

Much of the potassium chloride mined in the world is in the form of sylvinite, a double salt of sodium and potassium chloride of variable composition. The method used to prepare syngenite from potassium chloride can be readily modified to use sylvinite as starting material. In fact, an advantage exists in using sylvinite in that the sodium chloride generated by the syngenite synthesis can be discarded along with the sodium chloride in the sylvinite without separate segregation or evaporation.

Examination of the phase relationships plotted in FIGS. 1 to 4 will explain the parameters controlling the overall process.

Figure 1:
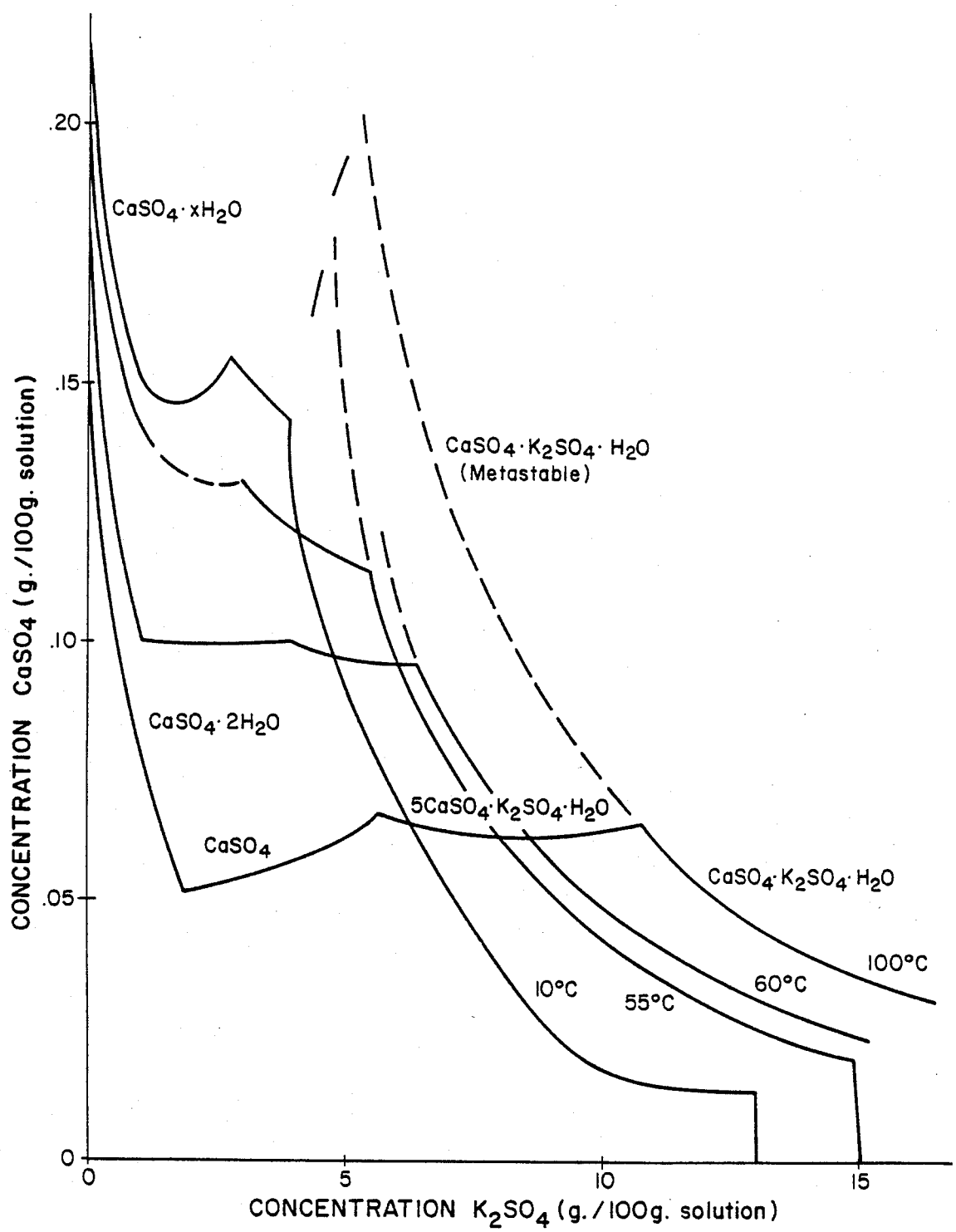
FIG. 1 is a phase diagram of the $CaSO_4$-$K_2SO_4$-$H_2O$ system at varying concentrations of $K_2SO_4$ and $CaSO_4$, depicting the solubility equilibria conditions at isotherms of 40° C., 55° C., 60° C. and 100° C.

FIG. 1, plotted from data presented by Hill, A.E., J. Am. Chem. Soc. 56 1071-8, (1934) ibid. 59 2242-4 (1937) and Bodaleva, N.V. and Lepeshkov, I.N., Zh. Neorgan. Khim 1. 995-1007 (1956) plots the solubilities of different concentrations of calcium sulfate and potassium sulfate in water at four different temperatures.

These curves show the decreasing stability of syngenite as the temperature increases from 40° C. to 100° C. This shows that syngenite is best synthesized at lower temperatures and decomposed into calcium and potassium sulfate at higher temperatures.

These same curves further indicate that in order to produce stable syngenite, the concentration of potassium sulfate in the solution must be in excess of about 4% w/w at 40° C. increasing to about 11% w/w at 100° C.

Any process synthesizing syngenite from potassium sulfate solutions must then operate within these parameters. We have shown that it is possible with solid calcium sulfate to obtain syngenite from solutions containing potassium ions, added as potassium chloride, and sulfate ions, added as sodium sulfate, ammonium sulfate, or other soluble sulfates, in concentrations which satisfy the solubility product for syngenite at the reaction temperature.

Figure 2:
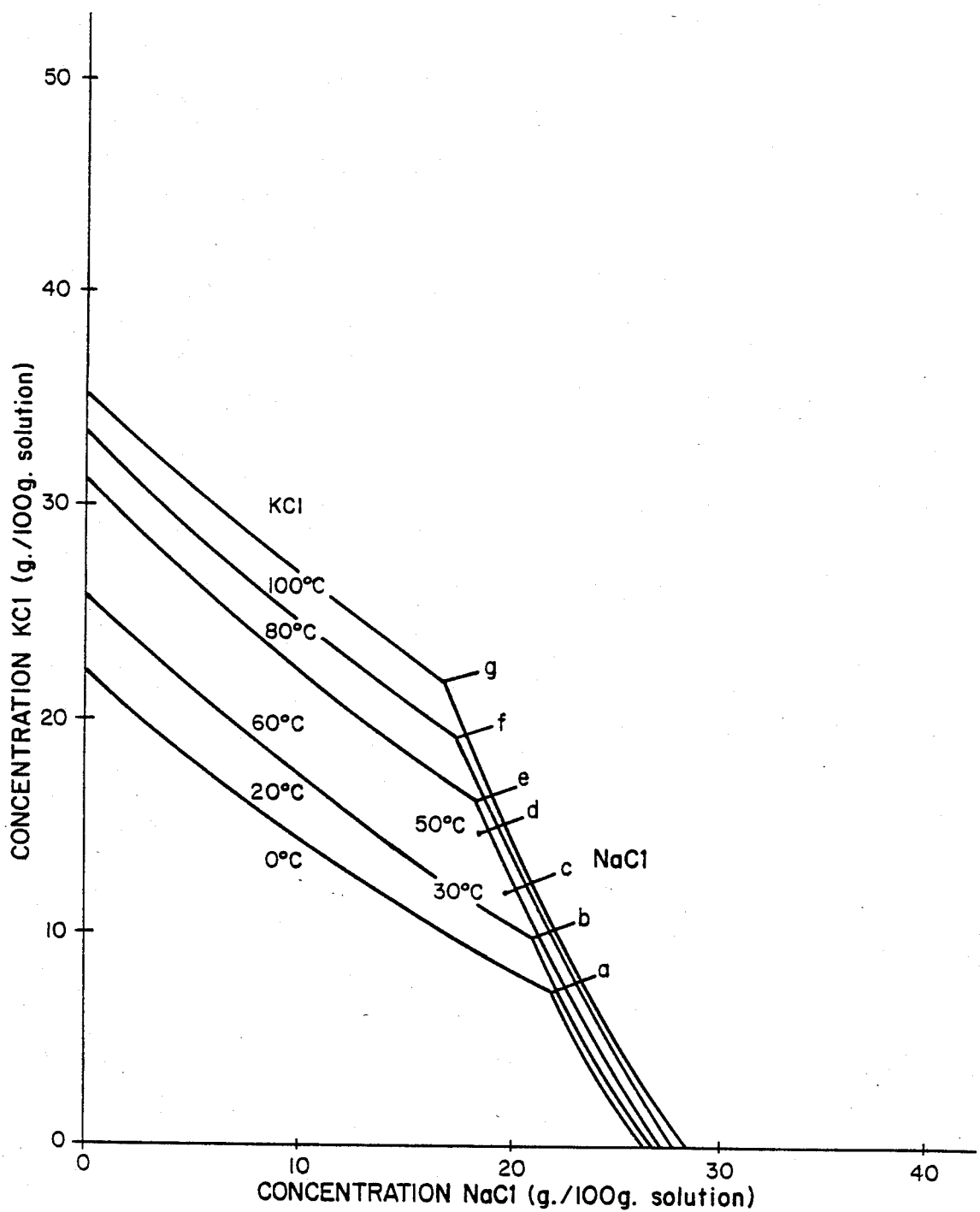
FIG. 2 is a phase diagram of the KCl-NaCl-$H_2O$ system at varying concentrations of KCl and NaCl, depicting the solubility equilibria conditions at isotherms of 0° C., 20° C., 60° C., 80° C. and 100° C.

Further, we have shown that satisfactory concentrations of potassium chloride can be obtained directly from sylvinite by taking advantage of the mutual solubilities of sodium and potassium chloride as presented in FIG. 2, which is based on data of Cornec, E. and Krombach, H., Compt. Rend. 194, 714-6 (1932).

The invariant points a-g represent the compositions of solutions in equilibrium with both sodium and potassium chloride at the appropriate temperature. Thus, a solution at point b at 20° C., when heated to 80° C. and used to leach sylvinite, will dissolve potassium chloride and discard solid sodium chloride until it attains the composition of point f on the 80° C. curve.

If such a solution at 80° C. is now contacted with the appropriate amount of calcium sulfate and an amount of sodium sulfate equivalent to the calcium sulfate is added to the solution, which is allowed to cool to 20° C., syngenite is formed.

The concentration of potassium chloride can be reduced to that at point b by choosing the appropriate amounts of calcium and sodium sulfate. The sodium chloride produced by the reaction $CaSO_4 + 2KCl + Na_2SO_4 + H_2O \rightarrow 2NaCl + CaSO_4.K_2SO_4.H_2O$ is in excess of that in solution at point b so that the excess will precipitate along with the syngenite while the remainder will stay in solution at point b. After separation of the precipitated solids, the solution may be heated to 80° C. and recycled to leach sylvinite and dissolve fresh potassium chloride while rejecting the remainder of the sodium chloride generated by the syngenite synthesis step. This sodium chloride is then discarded along with that remaining after solution of the potassium chloride from the sylvinite. Alternatively, potassium chloride alone may be added to the solution at 80° C., where it will dissolve to satisfy point f, and sodium chloride will be precipitated and can be removed.

Phase considerations also restrict the conditions for the decomposition of the syngenite and for separation of the potassium sulfate so produced. Diagrams 3 and 4 are merely two different ways of presenting the phase diagram for $K_2SO_4$-$H_2SO_4$ in water plotted from data of D'Ans, J.Z., Anorg. Chem. 63 225-9 (1909), Stortenbecker, W., Rec. Trav. Chem. 21, 407 (1909), and Babaewa, A. W., Trans. Inst. Pure Chem. Reagents (Moscow) lll 114 (1931).

Our studies have shown that in the presence of hydrogen ion at elevated temperature (>60° C.), syngenite decomposes into either calcium sulfate or penta salt (5$CaSO_4$.$K_2SO_4$.$H_2O$), dependent upon conditions. The mechanism appears to depend upon the conversion of sulfate ion in solution into bisulfate ion with consequent dissolution of K$_2$SO$_4$ from the syngenite to try to restore the sulphite concentration in solution according to the equation:

$$(SO_4)^{--} + H^+ \rightarrow (HSO_4^-).$$

If sufficient hydrogen ion is present in the form of sulfuric acid, or other acid with a dissociation constant greater than the second dissociation constant of sulfuric acid, $1.2 \times 10^{-2}$, the syngenite will totally decompose into solid CaSO$_4$ and potassium and bisulfate ions in solution.

To maximize decomposition using sulfuric acid, therefore, the sulfuric acid content in solution must be sufficient to convert all the potassium sulphate, both any in solution originally and that liberated from the syngenite, into potassium bisulfate solutions.

Figure 3:
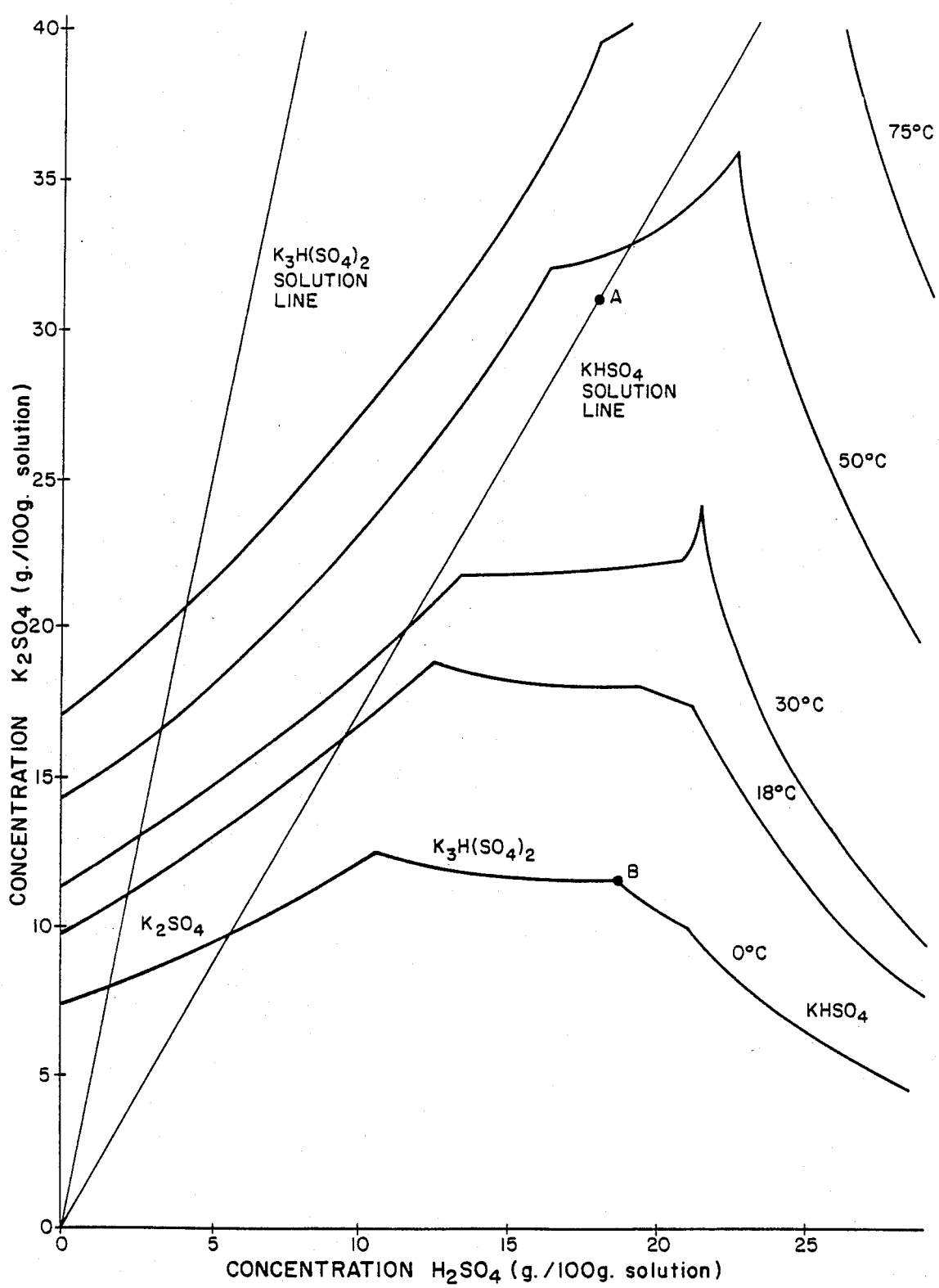
FIGS. 3 and 4 are two different phase diagrams for the $K_2SO_4$-$H_2SO_4$-$H_2O$ system at varying concentrations of $K_2SO_4$ and $H_2SO_4$, depicting the isotherms at 0° C., 18° C., 30° C., 50° C. and 75° C.
Figure 4:
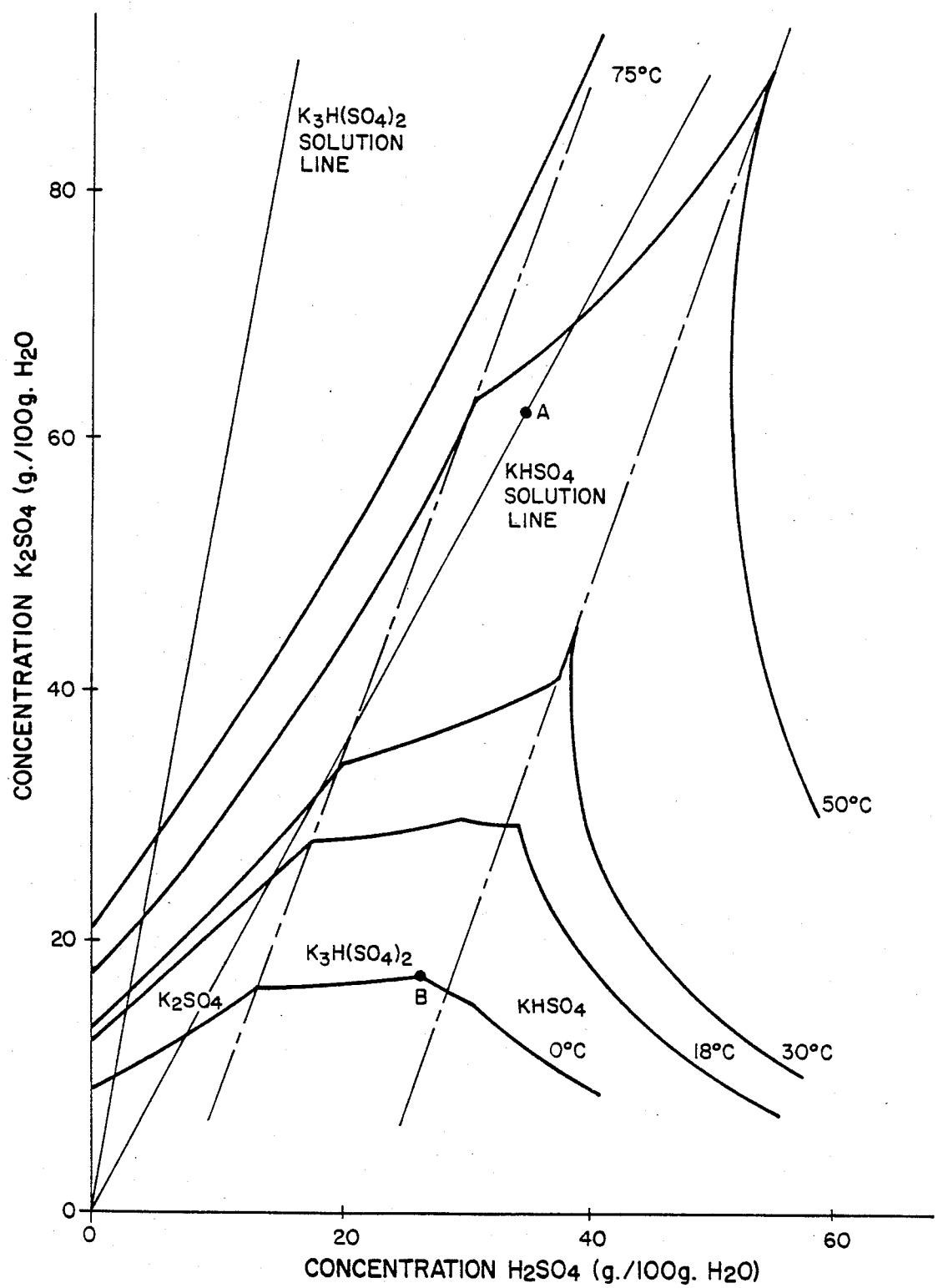

Such solutions are represented by the KHSO$_4$ solution line plotted in FIGS. 3 and 4. Solutions, after syngenite decomposition, with compositions to the left of the line, i.e., excess potassium sulfate, will be technically feasible but economically unsatisfactory, since the amount of potassium sulfate liberated from the syngenite is directly equivalent to the amount of free sulfuric acid available in the decomposition solution, since it is the hydrogen ions which convert sulfate to bisulfate ions.

Inspection of FIG. 4 shows that even solutions containing free sulfuric acid in excess of that required to form bisulfate upon cooling will, under appropriate conditions, yield crystals, not of potassium bisulphate, but of the double salt K$_3$H(SO$_4$)$_2$. However, at low starting temperatures, $<30°$ C., bisulfate composition solutions will, in fact, yield potassium sulfate on cooling. The mother liquor will contain free acid and may be recycled to decompose fresh syngenite.

FIG. 4 also shows that, at any given temperature, with sulfuric acid concentrations lower than that at the invariant point (i.e., where the solid double salt K$_3$H(SO$_4$)$_2$ along with solid potassium sulfate are in equilibrium with the solution) the solid phase in equilibrium is potassium sulfate. Thus, for example, at 30° C. the addition of double salt to solutions containing less than 20 grams of H$_2$SO$_4$ per 100 grams water will result in the crystallization of potassium sulfate until such additions bring the sulfuric acid concentration in the mother liquor to 20 grams per 100 grams water. After separation of the solid potassium sulfate, such mother liquor may be recycled to syngenite decomposition after suitable concentration by evaporation. At higher temperatures, up to the boiling point of the solution, a similar result is obtained, but with higher concentration solutions being recycled. This reduces the amount of evaporation required.

Although such isothermal crystallization of potassium sulfate is preferred, the double salt, K$_3$H(SO$_4$)$_2$, may be dissolved in hot water to yield solutions with compositions on the K$_3$H(SO$_4$)$_2$ solution line in FIGS. 3 and 4. Such solution, upon cooling, will yield potassium sulfate as the solid phase, and the mother liquor may be recycled to syngenite decomposition.

Sufficient K$_3$H(SO$_4$)$_2$ is dissolved to produce a concentration of K$_3$H(SO$_4$)$_2$ solution such that K$_2$SO$_4$ is the species which precipitates and is in equilibrium with the saturated K$_3$H(SO$_4$)$_2$ solution at the crystallization temperature. The preferred temperature for this solution step is that temperature producing the maximum concentration which, when cooled, will yield K$_2$SO$_4$. Typically, a solution containing 46.5% K$_3$H(SO$_4$)$_2$ on a weight to weight basis (87.5 grams of K$_3$H(SO$_4$)$_2$/100 grams of water) at 95° C., will, when cooled to 0° C., precipitate K$_2$SO$_4$ crystals.

In order to operate the process in its most financially economical way it is desirable to minimize plant equipment size, which means operating at conditions which will give maximum through-put for a given unit size.

For this reason, it is clearly best to leach sylvinite at the highest feasible temperature, about 100° C., thereby extracting the maximum amount of potassium chloride and obtaining the invariant solution of highest concentration. Assuming that we wish to maintain the potassium chloride concentration, after synthesis, greater than 3.5%, this defines the amount of KCl which can be reacted and hence the amount of NaCl produced (see FIG. 2). It is clear that at this portion of the solubility curve, temperature is unimportant.

The lowest potassium concentration quoted above is derived from examination of FIG. 1, which defines the lowest K$_2$SO$_4$ concentration in equilibrium with syngenite at 40° C. as about 4 grams per 100 grams solution which is equivalent in potassium concentration to 3.5 grams KCl per 100 grams solution. In practice, we have shown that at 20° C., KCl concentrations as low as 2.9 grams per 100 grams are satisfactory. FIG. 1 also shows that the stability range of syngenite is greater at lower temperatures, which defines the most useful synthesis temperature range as being below 60° C., probably below 40° C., which has, in fact, been confirmed by experiment.

As already mentioned, an examination of FIGS. 3 and 4 shows that the most efficient syngenite decomposition conditions are ones where the composition of the solution, after decomposition, lies on the potassium bisulfate solution line. These compositions should also yield the double salt, K$_3$H(SO$_4$)$_2$, upon cooling, and the highest concentration solution meeting these criteria is that at point A on FIGS. 3 and 4 which, upon cooling, to 0° C. yields a solution at point B.

Point A has a composition of about 31.6 g. K and 17.8 grams H per 100 grams solution while point B corresponds to about 12 grams K and 18.5 g. H per 100 grams solution. The cooling, therefore, crystallizes out double salt containing the equivalent of 22.86 grams K$_2$SO$_4$, along with 4.3 grams H$_2$SO$_4$ per 100 grams of initial solution.

It can be shown by studying the diagrams in depth that no other composition of solution has such a favorable yield of K$_2$SO$_4$ with as good a K$_2$SO$_4$/H$_2$SO$_4$ ratio.

Figure 5:
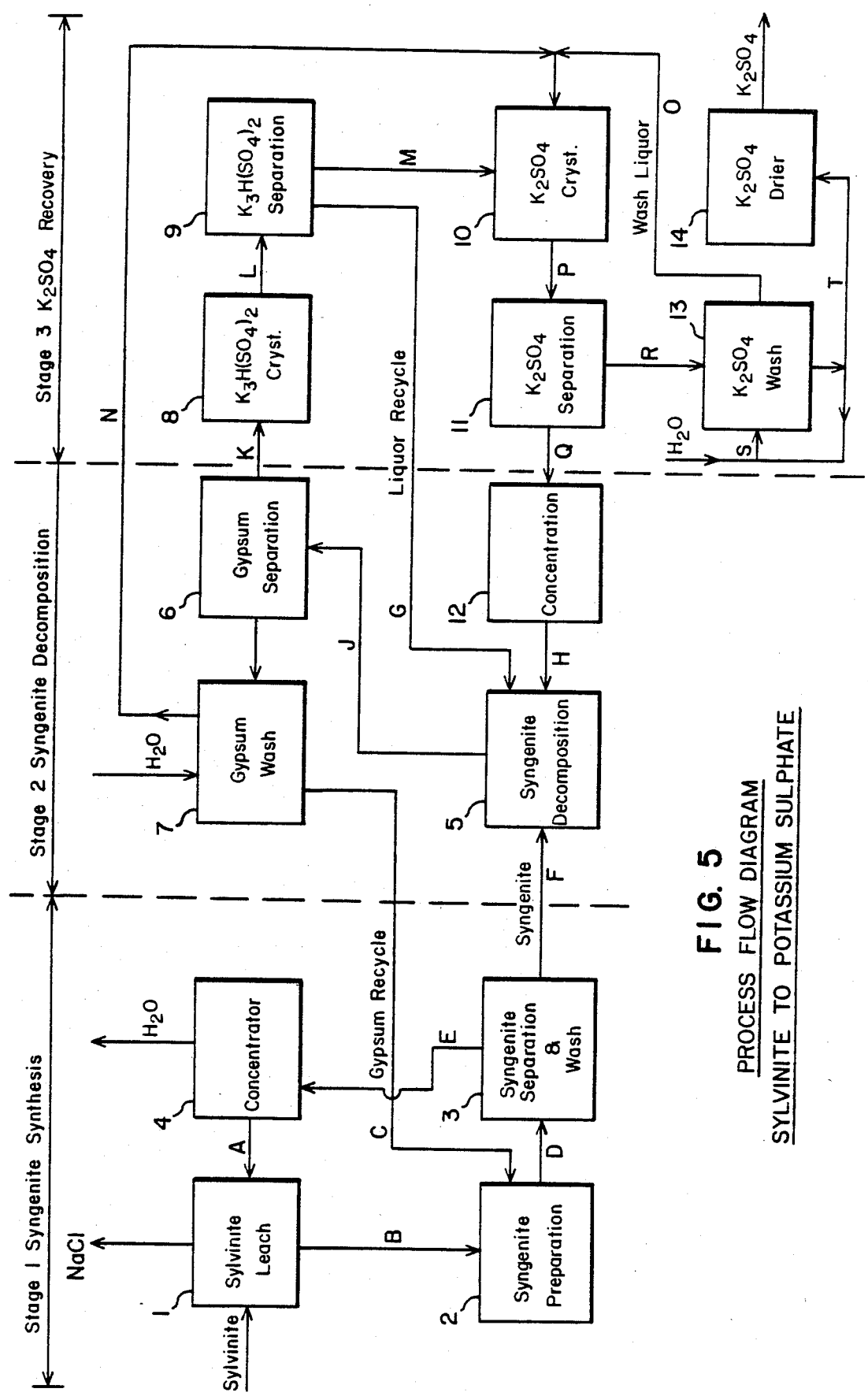
FIG. 5 is a flow diagram of the process of this invention wherein sylvinite is converted to potassium sulfate.

The invention may best be described by reference to FIG. 5. A potassium chloride salt, such as sylvinite or KCl, and recycle solution A, to be described below, are contacted, in leach system 1, wherein potassium chloride is dissolved and solid sodium chloride precipitated. The sodium chloride is discarded. The preferred temperatures for this step are in the range between about ambient and the boiling point of the solution. Eighty degrees centigrade (80° C.) to 100° C. is the most preferred temperature range.

The leach solution B is now fed to the syngenite preparation unit 2, wherein it is allowed to cool while reacting with a calcium sulfate salt and additional sulfate. Suitable additional sulfate sources include, but are not limited to, (NH$_4$)$_2$SO$_4$ and alkali metal sulfates. Suitable calcium sulfate salts include, but are not limited to, CaSO$_4$ and the penta salt, 5CaSO$_4$.K$_2$SO$_4$.H$_2$O. At least a part of this addition may come from the by-product recovery of the subsequent syngenite decomposition. The syngenite slurry, D, so produced, is separated by, for example, filtration and washed to remove sodium chloride in unit 3. The mother liquor and washings, E, may be concentrated to remove the wash water in concentrator 4 and recycled to the leach stage as the concentrate A.

Solid syngenite, F, is fed to the syngenite decomposition vessel 5, maintained at elevated temperature, along with a mineral acid. The mineral acid may be supplied in the recycled liquor, G and H, from later stages in the process. "Gypsum" slurry, J, is separated by filtration in separation unit, 6, and the solid "gypsum" washed in 7 with water. This "gypsum" may be recycled to syngenite preparation, 2, as C.

Suitable temperatures for the acid decomposition of syngenite are in the range of ambient to boiling, with temperatures above about 70° C. preferred. Eighty degrees centigrade (80° C.) or above are the most preferred temperatures. The reaction goes to completion at atmospheric pressure, usually requiring a time of about 30 minutes to 2 hours. Appropriate concentrations for proceeding to the next step are as set out in FIGS. 3 and 4.

The mother liquor, K, from 6, containing $KHSO_4$, is cooled to 0° C. in crystallizer 8 to precipitate $K_3HSO_4$ crystal slurry L which is separated by, for example, filtration in 9. It is preferred that the solution containing $KHSO_4$ be cooled to a temperature in the range of about 0° C. to 45° C., preferably in the range of about 0° C. to 30° C. The most preferred range is about 0° C. to 20° C. The mother liquor Q may be recycled to syngenite decomposition in 5.

The double salt $K_3H(SO_4)_2$ obtained from the cooling step above is slurried at 100° C. in the wash liquors N and 0 in crystallizer, 10. Wash liquor N is recycled from the gypsum wash 7, while wash liquor O is recycled from a subsequent potassium sulfate wash.

Potassium sulfate crystals so produced, P, are separated in 11 and the mother liquor, Q, after concentration in evaporator, 12, is recycled to syngenite decomposition 5. The crude potassium sulfate crystals R are washed in 13 with saturated potassium sulfate solution S before being passed as wet potassium sulfate T to the drier 14, from which the product $K_2SO_4$ is obtained.

Having generally described the invention, a better understanding can be obtained by reference to certain specific preliminary examples, which are provided herein for purposes of illustration only and are not intended to be limiting unless otherwise specified.

EXAMPLE 1

This example shows that potassium chloride and sodium sulfate can be used to prepare syngenite.

A saturated solution of potassium chloride was prepared by dissolving 859 grams of potassium chloride in 2500 grams water at 23° C. To this solution was added 115 grams potassium chloride, 216.5 grams sodium sulfate and 186 grams anhydrous calcium sulfate. This mixture was reacted at 23° C. for two hours. The slurry was filtered, and the product washed and dried. The product contained 22.3% potassium and 60.43% sulfate. The 414.2 grams of dried product represents a yield of 92.3% based on the calcium sulfate.

EXAMPLE 2

This example demonstrates that ammonium sulfate can be used for the preparation of syngenite by reaction with potassium chloride and calcium sulfate.

A calcium sulfate slurry was prepared by adding 77 grams of calcium hydroxide to 730 grams of water and reacting this mixture with 101.6 grams of concentrated sulfuric acid (97%) and cooling to 10° C.

Syngenite was prepared from the above mixture by adding 149.1 grams potassium chloride, 132 grams ammonium sulfate and 520 grams additional water. This mixture was stirred for one hour at 10° C., filtered, and the product washed with approximately 600 grams water.

The washed product, after drying, weighed 266.9 grams (81% yield), and had potassium, sulfate, calcium, ammonium (as nitrogen) and chloride ion contents of 18.46%, 62.65%, 14.17%, 0.0 and 0.07%, respectively. This represents 100% conversion based on potassium, allowing for the potassium sulfate remaining in the solution and washings, in equilibrium, with the syngenite.

EXAMPLE 3

This example illustrates that syngenite can be prepared from a sylvinite leach liquor mutually saturated with potassium and sodium chloride, containing potassium chloride, sodium chloride and water contents of 20%, 17.5% and 62.5%, respectively.

One kilogram of the above clear solution at 80° C. was placed in a reactor and to it was added, in order, 71 grams sodium sulfate and 68 grams calcium sulfate. The mixture was reacted at 80° C. for 30 minutes, then cooled to 23° C. The total reaction time was about two hours. The reaction slurry was filtered, washed and dried. The dried product, 140.7 grams, contained 22.3% potassium, 59.1% sulfate and 0% chloride ion. The 140.7 grams of product represents a 96% yield based on the calcium sulfate.

EXAMPLE 4

This example shows that syngenite can be effectively decomposed with sulfuric acid.

Filtrate solution, 476 grams, from a prior decomposition containing 29.2% potassium sulfate and 14.7% sulfuric acid was reacted with 47.9 grams sulfuric acid (97%) and 140 grams syngenite for 2 hours at 100° C., the resultant slurry was filtered hot (90° C.). The residue was washed and dried to yield 43.2 grams of calcium sulfate solids containing 2.6% potassium, 64.2% sulfate and 0% chloride. The decomposition efficiency, when adjusted for 5.9 grams of potassium sulfate that was contained in the solution held by the wet gypsum residue before drying, was about 100%.

EXAMPLE 5

This example shows that nitric acid will also decompose syngenite. 241 grams of syngenite was reacted with 500 grams of a 1.51 molar $HNO_3$ acid solution containing 48.3 grams of $HNO_3$ for 2 hours at 60° C.

The resultant slurry was filtered, the 166 grams wet solids were washed and dried. The 116.8 grams of dry solids contained 9.5% potassium and 63.9% sulfate. The decomposition efficiency to calcium sulfate under these conditions was 81% based on the potassium remaining in the decomposition residues, and, to the penta salt, 95%.

EXAMPLE 6

This example demonstrates the crystallization of double salt, $K_3H(SO_4)_2$, from solutions with a sulfuric acid to potassium sulfate molar ratio of 1 to 1, equivalent to potassium bisulfate. 300 grams of potassium sulfate and 180.9 grams of sulfuric acid (94%) were dissolved in 519.1 grams water at 50° C. The solution was cooled to 0° C. and the solids which crystallized were removed by filtration to yield 283.6 grams wet solids, which, on drying, yielded 260.8 grams dry crystals of the double salt, analyzing K, 40.1% and $SO_4$, 61.8%. ($K_3H(SO_4)_2$ required K, 37.7%; $SO_4$ 61.9%). Yield based on potassium sulfate, 77.8%.

EXAMPLE 7

This example illustrates the isothermal crystallization of $K_2SO_4$ from $K_3H(SO_4)_2$ solution at 30° C. $K_3H(SO_4)_2$, 250 grams, is added to water, 200 grams, at 30° C. and the slurry so produced agitated for 2 hours. At the end of this time, the solids were removed by filtration and dried, to yield, after water washing, 148.9 grams dry solids analyzing K, 44.4%, $SO_4$ 54.7%. ($K_2SO_4$ requires K, 44.8%; $SO_4$, 55.2%.) The mother liquor contained K, 8.4% and $SO_4$ 19.9%, corresponding to 26.2 grams. $K_2SO_4/100$ grams $H_2O$ and 13.7 grams $H_2SO_4/100$ grams $H_2O$.

EXAMPLE 8

This demonstrates the separation of potassium sulfate crystals from solutions of the double salt, $K_3H(SO_4)_2$.

225 grams of the double salt produced in Example 6 were dissolved in 250 grams of water at approximately 100° C. When cooled to 0° C., the solution yielded 152.4 grams wet potassium sulfate crystals which gave a dry weight of 144.3 grams of material analyzing K, 44.9% and $SO_4$, 54.9%. ($K_2SO_4$ requires K, 44.8%; $SO_4$ 55.2%). Yield based on potassium sulfate, 72.0%.

EXAMPLE 9

This example demonstrates that a solution from a prior syngenite preparation can be regenerated by leaching a sylvinite-type ore composite, prior to reuse.

845.6 grams of a solution containing 6% potassium, 0.91% sulfate and 17.2% chloride or approximately 11.5% KCl and 20% NaCl was mixed with 175 grams potassium chloride, and 132 grams of sodium chloride at 80° C. for 1 hour. The slurry was filtered yielding 253.3 grams wet solid and 831.9 grams of solution. The wet solid was dried to 244 grams and contained 21.8% potassium, 2.11% sulfate and 55.0% chloride. The resultant leach solution contained 10.2% potassium, 19.5% chloride and 0.8% sulfate or 19.4% KCl and 16.9% NaCl.

This solution composition, as shown in Example 3, is satisfactory for syngenite preparation and corresponds to point f on FIG. 2.

What is claimed is:

1. A process for producing $K_2SO_4$, comprising:
    (a) forming syngenite;
    (b) decomposing the syngenite formed in step (a) with sulfuric acid to produce a solution of $K^+$, $H^+$, and sulfate and bisulfate ions expressed as $SO_4^=$ in a molar ratio of 1:1:1 and solid calcium sulfate or the penta salt;
    (c) separating the solution produced in step (b) at the reaction temperature from the solid calcium sulfate or penta salt;
    (d) controlling the concentration of said solution as produced in step (b) such that when the solution is cooled to a first temperature of about 0° to 45° C. a double salt $K_3H(SO_4)_2$ crystallizes;
    (e) cooling the $KHSO_4$ solution produced in step (d) to the first predetermined temperature and separating the $K_3H(SO_4)_2$ crystals thus produced;
    (f) forming $K_2SO_4$ by contacting the separated $K_3H(SO_4)_2$ crystals separated in step (d) with water or a recycled aqueous wash liquor containing water and low concentrations of $K^+$, $H^+$ and sulfate and bisulfate ions at a second temperature in the range of about 0° to 100° C. but above that of step (d) such that the crystalline phase in equilibrium is $K_2SO_4$; and
    (g) recovering $K_2SO_4$.

2. The process of claim 1 wherein the first temperature is 0° to 30° C.

3. The process of claim 1 wherein the first temperature is 0° to 20° C.

4. The process of claim 1 and further comprising recycling the mother liquor produced in step (d) to step (b).

5. The process of claim 1 and further comprising concentrating the mother liquor produced in step (f) and recycling it to step (b).

6. The process of claim 1 wherein the second temperature is 30° to 100° C.

* * * * *